United States Patent Office
3,288,586
Patented Nov. 29, 1966

3,288,586
HERBICIDAL METHODS EMPLOYING AN ADDITION COMPOUND OF 3-(3,4-DICHLOROPHENYL)-1-METHYL-1-METHOXYUREA AND DODECYLBENZENESULFONIC ACID
Clarence A. Littler, Wilmington, Del., assignor to E. I. du Pont de Nemours and Company, Wilmington, Del., a corporation of Delaware
No Drawing. Filed June 15, 1965, Ser. No. 464,229
1 Claim. (Cl. 71—2.6)

This application is a continuation-in-part of my copending application S.N. 322,034, filed November 7, 1963 which is a continuation-in-part of my application S.N. 128,653, filed August 2, 1961, both now abandoned.

This invention relates to aryl urea derivatives having outstanding herbicidal properties.

More specifically, this invention relates to a method of destroying weeds comprising applying to an area to be protected a weed-controlling amount of a 1:1 mole ratio addition compound of (1)
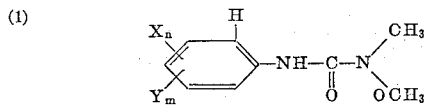

wherein

X is chlorine or bromine;
Y is alkyl of 1 through 3 carbon atoms;
$n$ is 0, 1, 2 or 3;
$m$ is 0 or 1;
and the sum of $n$ plus $m$ is less than 4; and (2) an acid from the group consisting of halogenated aliphatic acid containing from 2 through 5 carbon atoms, halogenated benzoic acid, halogenated phenyl acetic acid, halogenated phenoxyacetic acid and monobasic hydrocarbyl sulfonic acid of less than 20 carbon atoms.

Preferred is the acid addition product of 3-(3,4-dichlorophenyl)-1-methoxy-1-methylurea commonly called linuron.

The urea compounds of this invention can be prepared by reacting the appropriate phenylisocyanate with N,O-dimethylhydroxylamine by the method described in Scherer U.S. Patent 2,960,534.

Thus compounds such as the following can be prepared:

3-(p-chlorophenyl)-1-methoxy-1-methylurea
3-(3,4-dichlorophenyl)-1-methoxy-1-methylurea
3-(2,4,5-trichlorophenyl)-1-methoxy-1-methylurea
3-(3-chloro-4-methylphenyl)-1-methoxy-1-methylurea
3-(p-bromophenyl)-1-methoxy-1-methylurea
3-(3-propyl-4-chlorophenyl)-1-methoxy-1-methylurea
3-(3-chloro-4-ethylphenyl)-1-methoxy-1-methylurea
3-(3-chloro-4-isopropylurea)-1-methoxy-1-methylurea
3-(3,4-dimethylphenyl)-1-methoxy-1-methylurea
3-(3-bromo-4-methylphenyl)-1-methoxy-1-methylurea
3-(3,4-dibromophenyl)-1-methoxy-1-methylurea
3-phenyl-1-methoxy-1-methylurea Preferred acids because the addition compounds formed from them have particularly outstanding herbicidal activity are:

2,3,5-trichlorobenzoic acid
2,3,6-trichlorobenzoic acid
2,3,5,6,-tetrachlorobenzoic acid
2,3,5-triiodobenzoic acid
2-methoxy-3,6-dichlorobenzoic acid
2-methoxy-3,5,6-trichlorobenzoic acid
2-methyl-3,6-dichlorobenzoic acid
2,5-dichloro-3-aminobenzoic acid
2,5-dichloro-3-nitrobenzoic acid
2,3,6-trichlorophenylacetic acid
2,3,5,6-tetrachlorophenylacetic acid
2-methoxy-3,6-dichlorophenylacetic acid
2,4-dichlorophenoxyacetic acid
2,4,5-trichlorophenoxyacetic acid Also preferred because of the grass-killing power and ease of preparation of their addition compounds are acids of the formula:

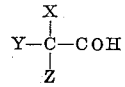

wherein

X is halogen;
Y is halogen, alkyl of from 1 to 3 carbon atoms, or haloalkyl; and
Z is halogen or alkyl.

Illustrative of these acids are:

Trichloroacetic acid
Tribromoacetic acid
Trifluoroacetic acid
α,α-Dichloropropionic acid
α,α-Dibromopropionic acid
α,α,β-Trichloropropionic acid
α,α,β-Trifluoropropionic acid
α,α-Dichlorobutyric acid
α,β-Dichloroisobutyric acid
α,β,β-Trichloroisobutyric acid
α,α-Dichlorovaleric acid Also preferred because of outstanding solubility characteristics obtained from their addition compounds are acids of the formula $RSO_3H$, where R is an aliphatic hydrocarbon radical, an aryl hydrocarbon radical, or a substituted aryl hydrocarbon radical, all preferably containing 6 to 20 carbon atoms. Illustrative of these acids are:

p-Tolylsulfonic acid
Dodecylsulfonic acid
Benzenesulfonic acid
p-Toluenesulfonic acid
Dodecylbenzenesulfonic acid
2,4,6-Trichlorobenzenesulfonic acid
Naphthalene-β-sulfonic acid The aryl ureas used to form the addition compounds of this invention are characterized by unsatisfactory solvent solubility. Representative compounds, for example, are soluble in xylene to the extent of only about 12% by weight at room temperature and much less at lower temperatures. This of course limits their formulability, ease of handling and effectiveness of use.

Research efforts to improve solvent solubility of aryl ureas generally have been discouraging. Even attempts in the art to prepare certain substituted phenyl-urea-acid addition compounds have been unsatisfactory because of the disappointingly low solvent solubility of these addition compounds.

By marked contrast, the acid addition compounds of the present invention have highly advantageous properties. For example, these novel addition compounds have greatly enhanced solubility in xylene, other commonly used aromatic weed oils and a large variety of other hydrocarbon solvents. Furthermore, dilute solutions of these addition compounds are highly stable, with the addition compounds remaining in solution without settling out even for extended periods of time. Of special importance, such addition compounds in hydrocarbon solvent solution can be readily mixed with water without phase separation.

The addition compounds of this invention can be prepared by simply bringing the two components together with mixing at a slightly elevated temperature of, say, 60° to 70° C. No substantial excess of either component is to be used.

These addition compounds, containing acids such as trichloroacetic acid are crystalline solids with sharp melting points. Addition compounds containing liquid acids such as dodecylbenzenesulfonic acid are themselves viscous liquids. All are characterized by unusually high solubility in xylene. The dodecylbenzenesulfonic acid derivatives are miscible in all proportions with xylene and this type of addition compound can be dispersed directly in water but with difficulty because of its high viscosity. By dilution with xylene or other hydrocarbons containing some aromatics, the viscosity is reduced and the product is self emulsifying. For these reasons, the addition compounds containing dodecylbenzenesulfonic acid and its close relatives are particularly preferred. Crystalline solid types as those containing trichloroacetic acid require added surfactants with the solvent to attain water dispersibility.

The addition compounds of this invention can be used as such, or when diluted, as with hydrocarbon solvent, water, or preferably both, in herbicidal applications where the aryl urea component is useful. Thus, the addition compounds are most effective as foliar herbicides and pre-emergence herbicides. They are particularly useful in weed control among crops such as asparagus, sugar can, grapes, berries, cotton, gladiola, field and sweet corn, sorghum, safflower, soybeans, sansevieria and potatoes, where effective weed control is obtained in conjunction with good growth of crops.

For herbicidal application, the addition compounds can conveniently be admixed for viscosity reduction with such known solvents as xylene, alkylated naphthalene, kerosene, No. 2 fuel oil, Stoddard solvent, dimethylformamide, cresol or other aromatic herbicidal oils. Preferably the solvent will be one having a boiling point in excess of 275° F. These compositions will comprise about 70–75% by weight of the addition compound and about 20–30% by weight of the solvent, and can readily be dispersed in oils or in water to give aqueous sprays which for the most part constitute a desirable composition for herbicidal application. The addition of surface-active agents is often desirable, especially for dispersion in water.

It is most convenient to prepare compositions as described in the preceding paragraph concurrent with preparation of the addition compound itself. Thus, the easiest method is to add the solvent to the two reactants forming the addition compound prior to reaction and agitate the mix at room temperature until a homogeneous liquid is obtained.

The active addition compound is, of course, applied for weed control in an amount sufficient to exert the desired herbicidal action. The amount of the active ingredient present in the compositions as actually applied for destroying, preventing or controlling weeds will vary with the manner of application, the particular weeds for which control is sought, the purposes for which application is made, and like variables. In general, the herbicidal compositions as applied in the form of a spray will contain from about 0.1% to 85% by weight of the active addition compounds. A spray concentration of about .1% to 50% is preferred.

Ordinarily, the compounds of this invention can be applied to the area to be treated at a rate from 0.25 to 50 pounds per acre. Ordinarily they will be applied at rates of 0.5 to 35 pounds per acre. When formulated with other materials, such materials can include fertilizer materials, other pest control agents such as insecticides and fungicides, and other herbicides. Highly effective herbicidal compositions can be prepared comprising at least one compound of this invention in admixture with another herbicidal ingredient. In addition, the composition can contain one or more of the compatible herbicidal composition adjuvants or conditioners as are fully described in Luckenbaugh U.S. Patent No. 2,935,393 issued May 3, 1960, the entire disclosure of which relating to compositions and methods of application being incorporated herein by reference.

When the addition compounds of this invention are to be used for pre- or postemergence weed control in agricultural crops, it is preferred not to use a phytotoxic weed oil with them. In such cases, they are best used simply as liquids dispersed in water. No additional agent is needed except to reduce the viscosity to a point where dispersion readily takes place, as referred to above. It is important to note that some of the acids of this invention are themselves highly herbicidal and nonspecific, hence improper for use with some agricultural crops.

The compounds of this invention are particularly useful in admixture with dimethylformamide where an unexpected increase in herbicidal effectiveness is noted in crop use, compared with the reactant aryl urea.

It is well known that, in all crop applications involving selective weed control, it is extremely important to be able to control dosage accurately. The present invention provides homogeneous liquid formulations, which in turn makes measurement of dosage and control of uniformity of the spray solution or emulsion practical for the average farmer.

The addition compounds of this invention applied as described above are also especially advantageous in eradicant use against difficult to control weed species, such as nutsedge, Bermudagrass, Johnsongrass, quack grass, para grass, Dallis grass, vasey grass, plantain, dandelion and bindweed.

In order that the invention will be better understood, the following examples are given in addition to those set forth above. Percentages are by weight.

*Example 1*

3-(3,4-dichlorophenyl)-1-methoxy-1-methylurea is reacted with technical dodecylbenzenesulfonic acid in the following manner:

87.0 grams of the methoxyurea is stirred in a 400 milliliter beaker with 113.0 grams of the dodecylbenzenesulfonic acid, then warmed at 60° C. with occasional stirring until all solid has disappeared. The resulting dark, viscous liquid is the 1:1 addition compound containing 41.3% methoxyurea.

Portions of the above liquid are diluted with xylene to determine at what level the viscosity is low enough for easy emulsification in water.

A 25 gram portion is diluted to 80% of the addition compound (33.1% methoxyurea) by adding 6.2 grams xylene. With both water and product at room temperature this emulsifies readily with stirring but at 40° F. it mixes with difficulty. A second 25 gram portion is reduced to 73% addition compound (30.15% methoxyurea) by adding 9.32 grams xylene. This product emulsifies with stirring even when cold.

Samples of this product are mixed with solvents at the rate of 0.2 gram of addition compound to 5.48 grams of solvent to yield solutions containing the 1:1 addition compound at a concentration equivalent to 1.5% methoxyurea (a conventional use level of urea herbicides in herbicidal oils). The solvents used are Diesel Fuel #2, Stoddard solvent, Lion Herbicidal Oil #6, xylene and Conoco Weed Oil. Solution is complete in each case and no separation occurs in three days.

Example 2

The following components are simply mixed together to form a homogeneous emulsified liquid.

| | Percent |
|---|---|
| 3-(3,4-dichlorophenyl)-1-methoxy-1-methylurea | 26.30 |
| Dodecylbenzenesulfonic acid | 34.41 |
| Dimethylformamide | 39.29 |

The product is a 1:1 addition compound of the methoxyurea and the acid in the solvent.

Example 3

| | Percent |
|---|---|
| 3-(3,4-dichlorophenyl)-1-methoxy-1-methylurea | 26.30 |
| Dodecylbenzenesulfonic acid | 34.41 |
| Xylene | 39.29 |

The above composition is prepared by simply stirring the components together to form a homogeneous liquid. The product is a 1:1 addition compound of the methoxyurea and the acid in the solvent.

Example 4

To 0.4993 gram of 3-(3-chloro-p-cumenyl)-1-methoxy-1-methylurea is added 0.6538 gram dodecylbenzenesulfonic acid and the mixture warmed at 70° C. until a homogeneous liquid is formed. Upon cooling, the product is a dark viscous liquid containing the 1:1 addition compound of the methoxyurea and the acid. This liquid composition is diluted by the addition of xylene to a concentration of the addition compound equivalent to 35% of the methoxyurea, giving a product low enough in viscosity to emulsify readily. This product is then frozen and thawed with no evidence of phase separation.

Example 5

Example 4 is repeated except that 0.500 gram of 3-(3-bromo-p-tolyl)-1-methoxy-1-methylurea is reacted with 0.6165 gram of dodecylbenzenesulfonic acid to yield a dark viscous liquid containing the 1:1 addition compound. Dilution, freezing and thawing give the same excellent results as in that example.

Example 6

Example 4 is repeated except that 0.500 gram of 1-methoxy-1-methyl-3-phenylurea is reacted with 0.936 gram of dodecylbenzenesulfonic acid to yield a dark viscous liquid containing the 1:1 addition compound. Dilution with xylene to a concentration equivalent to 30% of the methoxyurea and freezing and thawing as in that example give the same excellent results.

Example 7

The xylene concentrates of Examples 4 and 6 are diluted with various other oils as follows:

(a) The 3-(3-chloro-p-cumenyl)-methoxy-1-methylurea 35% concentrates of Example 4 is mixed with an equal volume of hexane. Miscibility is complete. A second sample is mixed with Diesel Fuel #2 to give a solution containing 1.5% of the methoxyurea. Again miscibility is complete and no phase separation occurs at −22° C. A third sample is mixed with four volumes of Stoddard solvent. Again miscibility is complete.

(b) A portion of the 30% concentrate of Example 6 is mixed with an equal volume of hexane. Miscibility is complete. A second sample is mixed with 8–10 volumes of Lion Herbicidal Oil No. 6. Miscibility is complete.

Example 8

A composition is prepared by simply stirring the following ingredients together:

| | Percent |
|---|---|
| 3-(3,4-dichlorophenyl)-1-methoxy-1-methylurea | 26.30 |
| Dodecylbenzenesulfonic acid | 34.41 |
| Stoddard solvent | 39.29 |

This product is a 1:1 addition compound of the methoxyurea in the solvent.

This formulation is readily added to herbicidal oils for general sterilant weed control along railroads and around bridge abutments and signposts. When applied at the rate of 10 pounds per acre (active) in 100 gallons Conoco or Lion Herbicidal Oil No. 6, excellent control is obtained of Johnsongrass, Bermudagrass, volunteer wheat, ryegrass, wild rye, plantain and goldenrod.

Example 9

The formulation of Example 1 is mixed with 40 gallons of water and applied as a directed post-emergence spray at the rate of 1 pound (active) per acre to emerged seedling annual broadleaf and grass weeds growing in corn 12 inches high. Excellent control is obtained of crabgrass, ryegrass, goosegrass, foxtail, chickweed, pigweed, velvetleaf and lambs-quarters.

The above examples can be repeated, substituting other methoxyureas within the scope of Formula 1 above for those of the examples, with similar results, as will be readily understood by persons skilled in this art.

Example 10

Eigthy-two parts of trichloroacetic acid are dissolved in 450 parts of n-hexane at room temperature. Next 124 parts of 3-(3,4-dichlorophenyl)-1-methyl-1-methoxyurea is added slowly to the solution. The urea dissolves during the addition until about 60% is added. Then solid starts to separate. The mixture is stirred for one hour after the addition. The precipitate is filtered and washed with n-pentane and air dried, to obtain 19.5 grams of the 1:1 addition compound (melting point 53–55° C).

Example 11

At room temperature, equimolar parts of trichloroacetic acid and 3-(3,4 - dichlorophenyl) - 1 - methoxy-1-methylurea are dissolved in reagent grade xylene, with the acid being added to the solvent first. After about one hour, the mixture is diluted with pentane and is cooled. A precipitate of the addition compound is formed, filtered washed with n-pentane and dried to obtain the acid addition product.

Using procedures similar to Example 11 with reaction times as needed to form a precipitate, the following compounds in 1:1 mole ratio are reacted to give the corresponding addition compounds according to the present invention:

| Ex. | Urea Reactant | Acid Reactant |
|---|---|---|
| 12 | 1-(3,4-dichlorophenyl)-3-methoxy-3-methylurea. | α,α-Dichloropropionic acid. |
| 13 | 1-(p-tolyl)-3-methoxy-3-methylurea | α,α,β-Trichloropropionic acid. |
| 14 | 1-(p-ethylphenyl)-3-methoxy-3-methylurea | α,α,α-Tribromopropionic acid. |
| 15 | 1-(2,4,5-trichlorophenyl)-3-methoxy-3-methylurea. | α,α,α-Trichloropropionic acid. |
| 16 | 1-(3-chloro-4-methylphenyl)-3-methoxy-3-methylurea. | α,β-Dichloroisobutyric acid. |
| 17 | 1-(p-isopropylphenyl)-3-methoxy-3-methylurea. | α,α-Dichlorobutyric acid. |
| 18 | 1-(3,4-dichlorophenyl)-3-methoxy-3-methylurea. | 2,3,5,6-tetrachlorobenzoic acid. |
| 19 | ----do---- | 2,3,6-trichlorobenzoic acid. |

| Ex. | Urea Reactant | Acid Reactant |
|---|---|---|
| 20 | do | 2,3,6-trichlorophenylacetic acid. |
| 21 | do | 2,3,5,6-tetrachlorophenylacetic acid. |
| 22 | 1-(p-chlorophenyl)-3-methoxy-3-methylurea | 2,3,5,6-tetrachlorobenzoic acid. |
| 23 | do | 2,3,6-trichlorobenzoic acid. |
| 24 | do | 2,3,6-trichlorophenylacetic acid. |
| 25 | do | 2,3,5,6-tetrachlorophenylacetic acid. |
| 26 | 1-(3-chloro-4-isopropylphenyl)-3-methoxy-3-methylurea. | 2-methoxy-3,6-dichlorobenzoic acid. |
| 27 | 1-(3,4-dimethylphenyl)-3-methoxy-3-methylurea. | 2-methoxy-3,5,6-trichlorobenzoic acid. |
| 28 | 1-(m-chlorophenyl)-3-methoxy-3-methylurea. | 3-amino-2,5-dichlorobenzoic acid. |
| 29 | 1-(o-chlorophenyl)-3-methoxy-3-methylurea. | 3-nitro-2,5-dichlorobenzoic acid. |
| 30 | 1-(3-chloro-4-ethylphenyl)-3-methoxy-3-methylurea. | 2,4-dichlorophenoxyacetic acid. |
| 31 | 1-(3-bromo-4-methylphenyl)-3-methoxy-3-methylurea. | 2,4,5-trichlorophenoxyacetic acid. |
| 32 | 3-phenyl-1-methoxy-1-methylurea | 2,3,5-trichlorobenzoic acid. |
| 33 | 3-phenyl-1-methoxy-1,1-dimethylurea | 2,3,6-trichlorobenzoic acid. |
| 34 | 1-(p-chlorophenyl)-1-methoxy-1-methylurea | 2,3,5,6-tetrachlorobenzoic acid. |
| 35 | 3-(p-chlorophenyl)-1-methoxy-1-methylurea | 2,3,5-triiodobenzoic acid. |
| 36 | 3-(3,4-dichlorophenyl)-1-methoxy-1-methylurea. | 2-methoxy-3,6-dichlorobenzoic acid. |
| 37 | do | 2-methoxy-3,5,6-trichlorobenzoic acid. |
| 38 | 3-phenyl-1-methoxy-1-methylurea | 2-methyl-3,6-dichlorobenzoic acid. |
| 39 | 3-(p-chlorophenyl)-1-methoxy-1-methylurea | 2,5-dichloro-3-aminobenzoic acid. |
| 40 | 3-(3,4-dichlorophenyl)-1-methoxy-1-methylurea. | 2,5-dichloro-3-nitrobenzoic acid. |
| 41 | 3-(o-chlorophenyl)-1-methoxy-1-methylurea | 2,3,6-trichlorophenyl-acetic acid. |
| 42 | 3-(m-chlorophenyl)-1-methoxy-1-methylurea | 2,3,5,6-tetrachlorophenylacetic acid. |
| 43 | 3-(3,4-dimethylphenyl)-1-methoxy-1-methylurea. | 2-methoxy-3,6-dichlorophenylacetic acid. |
| 44 | 3-(3-chloro-4-isopropylphenyl)-1-methoxy-1-methylurea. | 2,4-dichlorophenoxyacetic acid. |
| 45 | 3-(3-chloro-4-methylphenyl)-1-methoxy-1-methyl-1-isopropylurea. | 2,4,5-trichlorophenoxyacetic acid. |
| 46 | 3-phenyl-1-methoxy-1-methylurea | Trifluoroacetic acid. |
| 47 | do | α,α-Dichloropropionic acid. |
| 48 | 3-(p-chlorophenyl)-1-methoxy-1-methylurea | α,α-Dibromopropionic acid. |
| 49 | do | α,α,β-Trichloropropionic acid. |
| 50 | 3-(3,4-dichlorophenyl)-1-methoxy-1-methylurea. | α,α,β-Trifluoropropionic acid. |
| 51 | do | α,α-Dichlorobutyric acid. |
| 52 | 3-phenyl-1-methoxy-1-methylurea | α,β-Dichloroisobutyric acid. |
| 53 | 3-(p-chlorophenyl)-1-methoxy-1-methylurea | α,β,β-Trichlorobutyric acid. |
| 54 | 3-(3,4-dichlorophenyl)-1-methoxy-1-methylurea. | α,α-Dichlorovaleric acid. |
| 55 | 3-(2,4,5-trichlorophenyl)-1-methoxy-1-methylurea. | Methanesulfonic acid. |
| 56 | 3-(3-chloro-4-methylphenyl)-3-methoxy-1-methylurea. | Ethanesulfonic acid. |
| 57 | 3-(p-bromophenyl)-1-methoxy-1-methylurea | Dodecylsulfonic acid. |
| 58 | 3-(4-chlorophenyl)-3-methoxy-1-methylurea | Benzenesulfonic acid. |
| 59 | 3-(4-bromophenyl)-1-methoxy-1-methylurea | p-Tolylsulfonic acid. |
| 60 | 3-(3,4-dimethylphenyl)-1-methoxy-1-methylurea. | 2,4,6-trichlorobenzenesulfonic acid. |
| 61 | 3-(3-chloro-4-methylphenyl)-3-methoxy-1-methylurea. | Naphthalene-β-sulfonic acid. |
| 62 | 3,3,4-dichlorophenyl)-1-methoxy-1-methylurea. | 2,3,5-trichlorobenzoic acid. |
| 63 | 3-(p-bromophenyl)-1-methoxy-1-methylurea | 2,3,6-trichlorobenzoic acid. |
| 64 | 3-phenyl-1-methyoxy-1-methylurea | 2,3,5,6-tetrachlorobenzoic acid. |
| 65 | do | 2,3,5-triiodobenzoic acid. |
| 66 | do | 2,methoxy-3,6-dichlorobenzoic acid. |
| 67 | do | 2-methoxy-3,5,6-trichlorobenzoic acid. |
| 68 | do | 2-methyl-3,6-dichlorobenzoic acid. |
| 69 | do | 2,5-dichloro-3-aminobenzoic acid. |
| 70 | do | 2,5-dichloro-3-nitrobenzoic acid. |
| 71 | 3-(m-chlorophenyl)-1-methoxy-1-methylurea | 2,3,6-trichlorophenyl-acetic acid. |
| 72 | 3-(o-chlorophenyl)-1-methoxy-1-methylurea | 2,3,5,6-tetrachlorophenylacetic acid. |
| 73 | 3-(3-methyl-4-chlorophenyl)-1-methyl-1-methoxy urea. | 2-methoxy-3,6-dichlorophenylacetic acid. |
| 74 | 3-(3-chlorophenyl)-1-methoxy-1-methylurea | 2,4-dichlorophenoxyacetic acid. |
| 75 | 3-(3-chloro-4-ethylphenyl)-methyl-1-methoxyurea. | 2,4,5-trichlorophenoxyacetic acid. |
| 76 | 3-(3-chloro-4-methylphenyl)-1-methoxy-1-urea. | Trichloroacetic acid. |
| 77 | 3-(3-chlorophenyl)-1-methoxy-1-methylurea | Tribromoacetic acid. |
| 78 | 3-(3-chloro-4-isopropylphenyl)-1-methyl-1-methoxyurea. | Trifluoroacetic acid. |
| 79 | 3-(3-chlorophenyl)-1-methyl-1-methoxyurea | α,α-Dichloropropionic acid. |
| 80 | 3-(4-chlorophenyl)-1-methyl-1-methoxyurea | α,α-Dibromopropionic acid. |
| 81 | 3-(2-chlorophenyl)-1-methyl-1-methoxyurea | α,α,β-Trichloropropionic acid. |
| 82 | 3-(3-chloro-4-methylphenyl)-1-methyl-1-methoxyurea. | α,α,β-Trifluoropropionic acid. |
| 83 | 3-(3,4-dichlorophenyl)-1-methyl-1-methoxyurea. | α,β,β-Trichlorobutyric acid. |
| 84 | 3-(p-chlorophenyl)-1-methyl-1-methoxyurea | α,α-Dichlorovaleric acid. |
| 85 | 3-(3,4-dichlorophenyl)-1-methyl-1-methoxyurea. | Methanesulfonic acid. |
| 86 | 3-(p-chlorophenyl)-1-methyl-1-methoxyurea | Ethanesulfonic acid. |

The above examples can be repeated, substituting other ureas within the scope of Formula 1 above for those of the examples, with similar results, as will be readily understood by persons skilled in the art.

The invention claimed is:

A method of destroying weeds comprising applying to an area to be protected a herbicidally effective amount of a 1:1 mole ratio adition compound of 3-(3-4-dichlorophenyl)-1-methyl-1-methoxyurea and dodecylbenzenesulfonic acid.

References Cited by the Examiner

UNITED STATES PATENTS

| 2,801,911 | 8/1957 | Gilbert et al. | 71—2.6 |
| 3,079,244 | 2/1963 | Scherer et al. | 71—2.6 |
| 3,095,407 | 6/1963 | Brust | 71—2.6 X |
| 3,125,431 | 3/1964 | Kittila | 71—2.6 |

LEWIS GOTTS, *Primary Examiner.*

JAMES O. THOMAS Jr., *Examiner.*